Jan. 17, 1950  A. RICHARDS  2,494,720
FLAME CULTIVATOR
Filed March 1, 1946  3 Sheets-Sheet 1
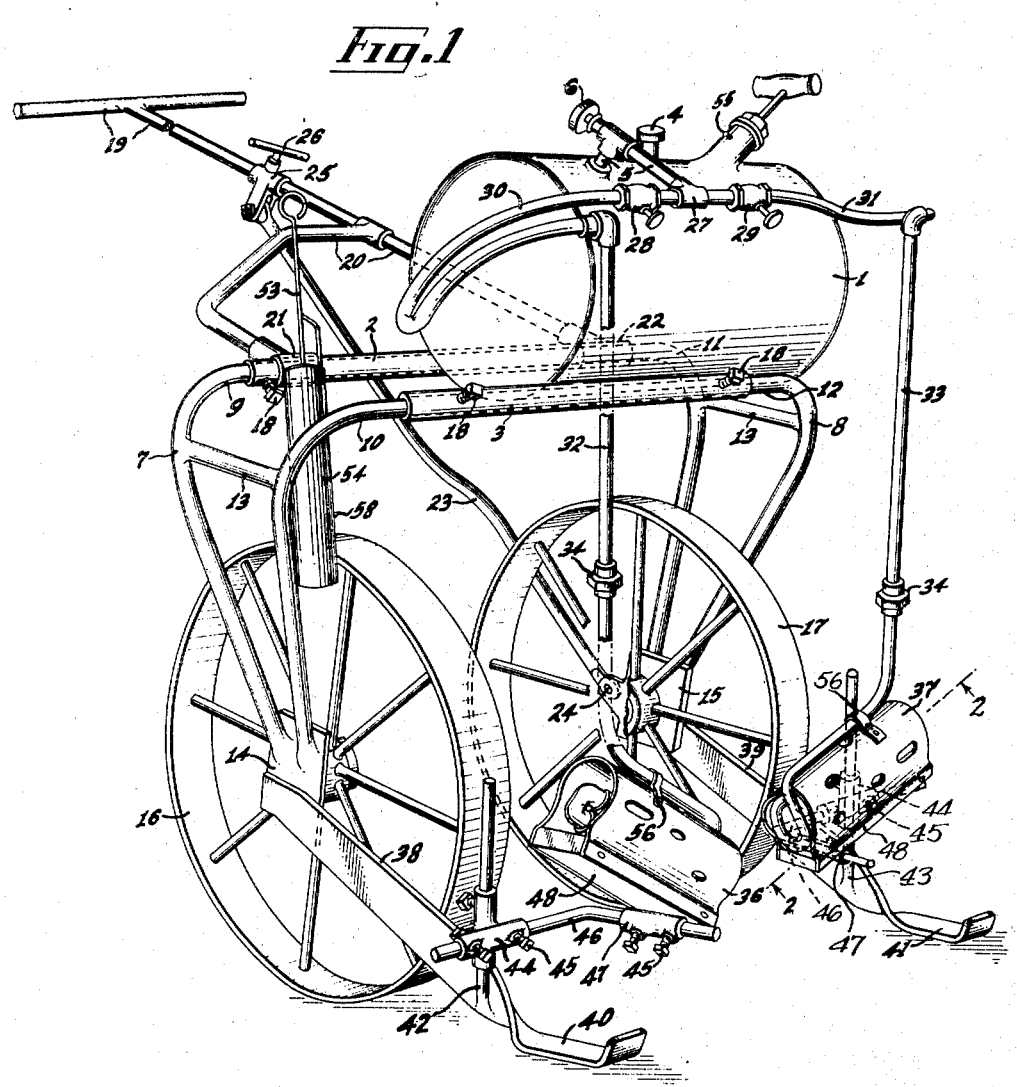
INVENTOR
Atherton Richards
BY Pennie Edmonds Morton & Barrows
ATTORNEYS Jan. 17, 1950        A. RICHARDS        2,494,720
FLAME CULTIVATOR
Filed March 1, 1946        3 Sheets-Sheet 2
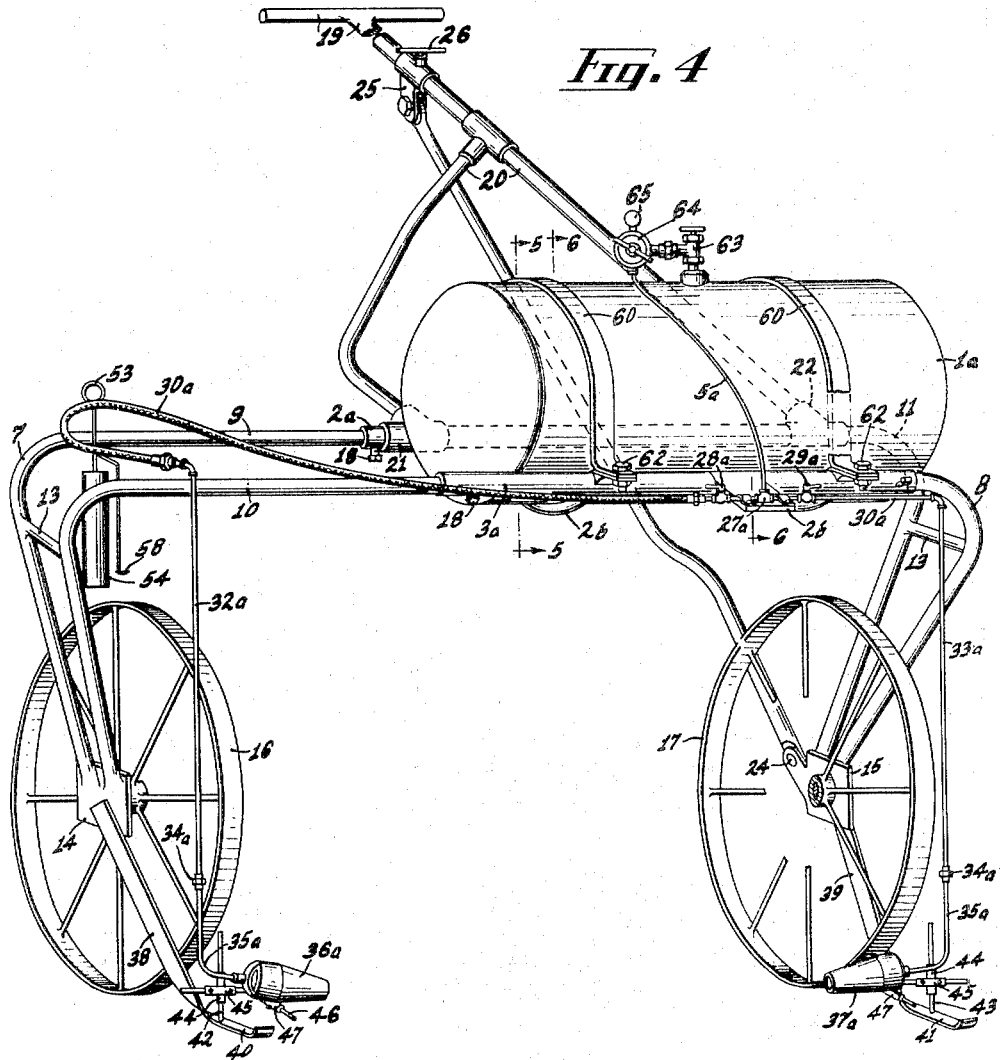
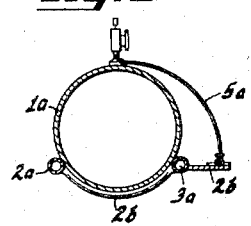
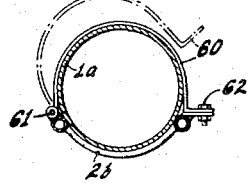
INVENTOR
Atherton Richards
BY
Pennie Edmonds Morton & Barrows
ATTORNEYS Jan. 17, 1950         A. RICHARDS         2,494,720
FLAME CULTIVATOR Filed March 1, 1946         3 Sheets-Sheet 3

INVENTOR
*Atherton Richards*
BY
*Pennie Edmonds Morton & Barrows*
ATTORNEYS

Patented Jan. 17, 1950

2,494,720

UNITED STATES PATENT OFFICE 2,494,720

FLAME CULTIVATOR

Atherton Richards, Luakoha, Honolulu, Territory of Hawaii, assignor, by mesne assignments, to Flame Cultivation, Incorporated, New York, N. Y., a corporation of Maryland Application March 1, 1946, Serial No. 651,086

3 Claims. (Cl. 126—271.2)

1

This invention relates to improvements in flame cultivators and more particularly to a hand operated self-generating flame cultivator.

The new hand operated flame cultivator is intended for use in flame cultivation in accordance with the process of the McLemore Patent No. 2,327,204, in which the crop rows are "hoed" or cultivated by directing flames into and across the crop rows.

The improved flame cultivator of the present invention is simple in construction, light in weight, and readily propellable by hand by an operator walking on one side of the row being cultivated. The cultivator is advantageously adjustable for varying row width and crops. It is also advantageously made up of parts which can be shipped in a compact space and readily assembled.

The new hand cultivator has a transverse frame member for supporting a tank or container of fuel, wheel supported side frame members secured thereto and provided with means for adjusting the width for varying crop rows and crops, supporting arms carried by the side frame members for adjustably supporting burners which are supplied with fuel from the fuel tank and an adjustable propelling handle for propelling the vehicle.

The flame cultivator is adjustably constructed with downwardly extending side frame members adjustably secured to an upper transverse frame member, as by telescoping engagement to permit varying the distance between the side frame members and the wheels so that unobstructed space is provided below the upper frame member and between the side frames and wheels for passage of the cultivator along the crop row.

The cultivator is also advantageously provided with a hand operated propelling handle on one side and with the fuel tank located near one side so that the operator can walk along the row on one side while the wheels travel on both sides of the crop row.

The nature and advantages of the invention will be further illustrated by the following more detailed description, in connection with the accompanying drawings, illustrating certain embodiments of the invention and in which Fig. 1 shows one form of the hand cultivator in perspective with certain parts broken away;

Fig. 2 is a sectional view of one form of burner taken on the line 2—2 of Fig. 1;

Fig. 3 shows one form of combination lighter and extinguisher;

Fig. 4 is a perspective view similar to that of Fig. 1 of a modified construction;

2

Figure 7:
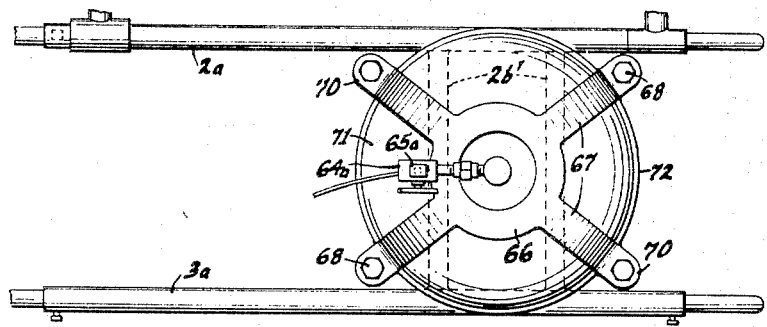

Figs. 5 and 6 are sectional views taken on the lines 5—5 and 6—6 of Fig. 4;

Fig. 7 is a plan view of another modification; and

Figure 8:
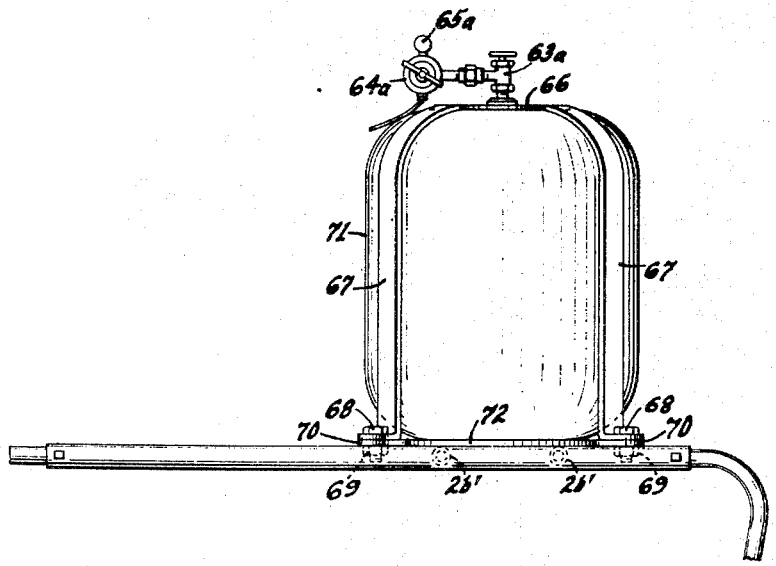

Fig. 8 is an elevation of the construction of Fig. 7.

In the flame cultivator shown in Figs. 1 to 3 the fuel tank 1 is shown as welded to two parallel tubular frame members 2 and 3, these frame members and tank forming the transverse frame member of the cultivator. The tank is shown as having a filling opening 4 for the introduction of liquid fuel and a fuel outlet pipe 5 having a pressure gauge 6 thereon. The outlet pipe 5 will extend to near the bottom of the tank, the portion of the pipe 5 inside the tank not being shown.

Two side frame members 7 and 8 are shown as of tubular construction. The lefthand frame member has horizontal tubular elements 9 and 10 telescoping into the tubes 2 and 3. The righthand side frame member similarly has tubular members 11 and 12 which telescope into the tubes 2 and 3. Set screws 18 on the transverse tubes 2 and 3 permit locking the side members when in adjusted position. These side frame members have cross tubes 13 for stiffening the side frame members, and lower axle members 14 and 15 for the wheels 16 and 17.

The propelling handle for the flame cultivator is also shown of tubular construction with the handle member 19 secured to the handle frame 20, which is rotatably mounted by T 21 on one end of the tube 2 and T 22 on the tube 11 at the other end of the tube 2. A diagonally arranged brace bar 23 is pivotally secured to the axle member 15 at 24 and is pivotally secured at its other end to the adjustable sleeve 25 which has a hand operated locking screw 26 for locking this adjustable sleeve in adjusted position.

The arrangement of the handle is such that it extends backwardly on one side of the cultivator, back of the righthand frame member and the wheel 17, so that the operator can walk along the same side of the row as the wheel 17, while the wheel 16 travels along the opposite side of the row. The fuel tank 1 is also shown as arranged near the same side as the propelling handle so that the greater portion of the weight will be carried by the wheel 17.

The oil supply connections for leading oil from the supply tank 1 and fuel outlet pipe 5 to the burners, includes a T connection 27 and pipes having burner regulating valves 28 and 29 therein, flexible hose connections 30 and 31 leading from the regulating valves to the burner extension pipes 32 and 33, each of which is connected through a union 34 with a pipe 35 leading to the burners 36 and 37. The flexible tube or hose 30 is shown as longer than the tube or hose 31 to take care of the longer extension of the side member 7 from the tubular frame members 2 and 3.

Extending forwardly from the axle members 14 and 15 are burner-supporting arms 38 and 39, the ends 40 and 41 of which are arranged to rest on the ground when the cultivator is not in use and to hold the cultivator in an upright position. Extending upwardly from these arms are members 42 and 43 having burner adjustment T clamps 44 thereon with set screws 45 for holding the T clamps in place and for holding the burner support bars 46 in adjusted position. Tubular attachment members 47 on the burners are mounted on the bars 46. The arrangement of the burner supports is such that the burners can be adjusted to the desired angle and elevation.

The burners illustrated in Figs. 1 and 2 are intended for the use of kerosene and have a preheating pan 48 filled with an asbestos wick and a burner shell 50 secured to the preheating pan. The oil supply pipe 35 has a coil for preheating and vaporizing the oil leading to the burner plug holder 51 and burner jet 52. A combined lighter and extinguisher 53 shown in Fig. 3 may be carried by a casing 54 mounted on the frame, this casing being partly filled with kerosene. The combined lighter and extinguisher has an absorbent lighter member 57 and an extinguisher disk 58. A strap 56 secures the pipe 35 to the shell 50 of the burner.

In order to light the burner and start it in operation the pan 48 is filled with kerosene which is absorbed by the asbestos wick 49 and ignited to preheat and vaporize the oil in the coil 35. The pan 48 can be filled or partly filled, e. g., three-quarters full of kerosene oil by slightly opening the burner regulating valve and allowing kerosene oil to flow to the preheating pan and then closing the burner regulating valve or by pouring oil into the preheating pan from another source. When the asbestos wick is lighted and allowed to burn, with the regulating valve shut off, the coil is preheated after which the burner regulating valve is slowly opened and the burner is first operated with a low flame to warm it to operating temperature.

The apparatus of Fig. 1 is intended for use with kerosene oil. The tank 1 is provided with a hand operated pump 55 by which pressure can be built up in the tank and maintained by occasional operation of the pump to insure sufficient pressure for feeding the oil through the regulating valves to the burners.

When the burners have been preheated and started in operation the oil will be vaporized in the coils and the vapor forced through the small vaporizing jet 52 at the back of the burner where it is ignited and produces a high velocity flame for the flame cultivation.

In the operation of the apparatus of Fig. 1 the tank 1 is filled about three-quarters full with kerosene and the pump 55 is operated to build up a pressure of around 35 pounds or more in the tank and the pump is operated from time to time to maintain the pressure therein, this pressure being indicated by the pressure gauge 6.

Before operating the flame cultivator it is adjusted in width to suit the row width of the crop, which is accomplished by sliding the telescoping members of one or both of the side frames inwardly or outwardly in the tubular members of the transverse frame. Ordinarily the wheels will be adjusted a sufficient distance apart so that they run about midway between the crop rows, although with unusually wide or narrow spacing of the rows this may not be possible. The burners are adjusted to the proper angle which is best accomplished by placing the machine in operating position in the crop row and determining the best setting in accordance with the height of the plant, condition of crop, etc. The propelling handle is adjusted so as to maintain the burners at their proper level when the machine is in motion and the handle is at a comfortable height for the operator. When the machine is at rest the ends 40 and 41 of the forwardly extending arms which support the burners rest on the ground. But when the cultivator is in use for flame cultivation these will be raised above the ground. The adjustable nature of the propelling handle enables it to be readily adjusted to different heights to suit the convenience of the operator and to maintain the burners at the desired position during flame cultivation.

After adjustment of the machine and burners the burners are lit and when they are operating satisfactorily to give a powerful, steady flame the cultivator is ready for operation and is operated by pushing it along the row, with the burners on each side of the row discharging a flame across the row near the ground. The rate of travel of the cultivator which is convenient to the operator will be sufficient for the flame cultivation when the burners are properly adjusted.

The pressure in the tank which is initially built up to around 35 pounds as shown by the gauge is kept above 30 pounds by occasional operation of the pump. To shut off the burners the regulating valves are closed tightly and the burner will go out in a short time. If it is necessary to put out the burner quickly the regulating valve is shut off and the disk 58 of the combination lighter and extinguisher is inserted through the back of the burner to deflect the stream of gas to one side and extinguish the flame.

After operation of the burners for some time, e. g., after a day or two's continual operation the burners may require cleaning. Where extra burners are provided the burner can be readily removed by disconnecting the union 34 in the fuel supply line and by removing the burner from its supporting arm and a clean burner installed and connected. During operation if one burner should go out it can be immediately relighted with the combination lighter and extinguisher from the burner in operation. If it is desired to raise the burners above the crop while the burner is being relighted the lowering of the propelling handle to the ground will accomplish this purpose. When the burner is relighted the raising of the handle will lower the flame and place the cultivator in position for further use.

The modified apparatus of Figs. 4 to 6 is intended for use with high pressure gas or liquefied gas. The same or corresponding parts of the apparatus of these figures are indicated by the same reference numerals as in Fig. 1 or with the letter "a" appended thereto.

In the modified apparatus of Fig. 4 a removable tank 1a is used and the transverse frame member is made up of tubes 2a and 3a united by cross members 2b, to give a rigid frame member for holding and supporting the tank 1a, which is shown as secured in place by straps 60 pivoted at 61 to the frame member 2a and bolted at 62 to an extension member 2b on the frame member 3a. The righthand frame member 8 of Fig. 4 is not intended to be adjustable but is shown as telescopically connected with the transverse frame members. Where one frame member is not adjustable or is rigidly secured to the transverse frame member the adjustment is effected by the other frame member, that is, the frame member 7 of Fig. 4.

The tank 1a for liquefied gas or high pressure gas may be a replaceable container which is taken off and replaced by another container or may be one which is refilled with a liquefied gas when empty. The cylinder 1a is shown as having a valve controlled outlet 63 connected with a pressure reducing and regulating valve 64 having pressure gauge 65 thereon for reducing the high pressure in the container to a lower regulated operating pressure. From the pressure regulator the vaporized gas under regulated pressure passes through the fuel line 5a to the T connection 27a mounted on the frame extension member 2b and connected in turn with burner regulating valves 28a and 29a by which the flow of fuel to the burners is regulated. The burners 36a and 37a of Fig. 4 are shown conventionally as burners adapted for use with gaseous fuel supplied under regulated pressure. The burners can be lighted by the use of the combined lighter and extinguisher 53.

The operation of the apparatus of Fig. 4 is similar to that of Fig. 1. The side frame members are spaced apart the proper distance for the crop rows to be cultivated, the burners are set at the proper elevation and angle and are lighted, and the cultivator is then pushed along the row by the operator. With the fuel tank located at the side of the cultivator at which the propelling handle is located the principal weight of the fuel will be carried by the wheel in front of the operator which facilitates steering of the cultivator and pushing it uniformly along the row. With the apparatus of Fig. 1 using liquid fuel the pump is operated from time to time by the operator to maintain sufficiently high pressure therein.

The modified apparatus of Figs. 7 and 8 is also intended for use with high pressure gas or liquefied gas and the same or corresponding parts of the apparatus of this modified construction are indicated by the same reference numerals as in Fig. 1 or with the letter "a" appended thereto.

The apparatus of Fig. 7 is similar to that of Fig. 1 but is intended for the use of an upright or vertical tank of liquefied or compressed gas which can be placed on the frame and secured thereto and which is readily removable to replace it with a fresh cylinder of gas. The cylinder 71 of Fig. 7 is a high pressure gas cylinder of conventional construction and containing several gallons of liquefied gas. The cylinder has a valve controlled outlet 63a connected with a pressure reducing and regulating valve 64a having pressure gauge 65a thereon, this construction being similar to that of the gas outlet connections shown in Fig. 4 and the arrangement of the gas pipes leading to the burners and of the burners is also similar to that of Fig. 4.

The transverse tubular frame members 2a and 3a of Figs. 7 and 8 are cross-connected by the pipes 2b' and an annular seat or frame member 72 is welded to the pipes for supporting the container 71. In order to hold the container in place and permit removal and replacement suitable attaching devices are provided for fastening the cylinder to the frame. In the construction shown an annular collar member 66 is arranged at the top of the container and straps 67 lead downwardly therefrom around the sides of the container and have openings at their lower ends, which correspond to openings in the brackets 70 on the frame, and with bolts 68 passing through the openings to hold the container in place. The loosening of the nuts 69 enables the container to be removed and replaced by another cylinder of the compressed or liquefied gas when the gas in the first cylinder has been used up. These cylinders are readily attachable to the flexible tubing leading to the burners and readily detachable therefrom.

The construction and operation of the apparatus of Figs. 7 and 8 is otherwise similar to that of Fig. 4, except for the different type of construction of gas container and the modified arrangement for mounting and securing the gas container on a somewhat modified frame structure.

By constructing the apparatus of tubular members or piping united together to form the frame members and by using similar piping for the handle the flame cultivator is relatively light in weight, the principal weight being that of the fuel tank carried thereby. By constructing the flame cultivator with an adjustable side member or with both side members adjustable the cultivator can be readily widened or narrowed to suit the spacing of the rows being cultivated.

The adjustable nature of the propelling handle enables the operator to adjust it to a comfortable position for operation so that the flames will be at the proper location along the ground or near the ground for the flame cultivation. However, the handle may be so constructed that it will suit the convenience of the operator without adjustment, or may have different parts of the handle arranged at different levels so that further adjustment will be unnecessary. The operator in pushing the cultivator can observe the height of the burners and readily raise or lower the handle to insure that the burners are at the proper level for the flame cultivation of the plants which in general will be at a level such that the flames hit the ground and spread out over the ground as the flames travel along and across the crop rows. Where the handle is adjustable, as in the apparatus illustrated, it is readily adjustable to the desired height by the operator.

One advantage of the flame cultivator illustrated resides in the fact that it is readily disassembled for packing and shipment and readily reassembled so that the apparatus can be shipped in a compact space. The side members are readily separated from the upper frame member and the wheels readily removed therefrom. The burners can also be readily removed for shipment and the propelling handle is also readily detached merely by sliding it off the frame members and disconnecting the parts of the operating handle where they are screwed together. The flame cultivator thus disassembled and shipped in a compact space can readily be reassembled by placing the wheels on the axles, putting the handle together and mounting it on the upper frame member, by sliding the telescoping side and upper frame members together and securing them in place and by attaching, adjusting and connecting the burners.

The improved flame cultivator of the present invention is intended and adapted for use in flame cultivation of smaller acreage of growing crops than those where a tractor driven flame cultivator would be used. The hand operated flame cultivator is well adapted for use with relatively short rows and with frequent turning around from one row to the next. It is intended for operation by hand and for operation by pushing the cultivator ahead of the operator but it can likewise be used by pulling it along the row or by attaching it to a tractor or other vehicle. When pushed by the operator the operation of the flame can be readily observed and the cultivator kept at the proper position so that the flames act at or adjacent the ground across the crop rows. When the operator stops, e. g., at the end of a row and lets go of the handle the cultivator will move forward until the ends of the burner supporting the arms rest on the ground, thus holding the cultivator in upright position. By lowering the handle to the ground the burners can be raised above the ground where this is desired.

While the improved apparatus of the present invention is particularly adapted for use in the flame cultivation of plants in crop rows, it is adapted for use for other purposes where it is desired to direct flames onto or along the ground to kill weeds or grass as on walks and driveways or in the wintertime to melt snow or ice on a walk or driveway. The construction and operation of the apparatus provides a simple and convenient method of applying flames on the ground and along the ground, and the burners, moreover, can be readily adjusted so that the flames, instead of being directed in general toward each other can be adjusted in a forward direction such that in use the operator can readily observe the action of the flames and operate the apparatus at a speed and with an arrangement of the flames to accomplish the desired flaming operation.

It will thus be seen that the present invention provides an improved hand operated flame cultivator with various features and advantages which adapt it for use for flame cultivation; and that it also adapted for use for other purposes where the application of flame along the ground is desired. Variations and modifications can be made in the specific construction illustrated and described without departing from the invention.

I claim:

1. A hand-operated flame apparatus comprising a pair of spaced fuel-tank-supporting members, side members connected to each end of each of said spaced fuel-tank-supporting members and extending downwardly to form an inverted generally U-shaped body adapted to pass over a crop row, said members being adjustably connected to said spaced fuel-tank-supporting members to permit varying of the distance between said side members, supporting wheels carried by the lower portions of said side members, and burners supported from said side members and positioned to project flames inwardly and across a crop row, along which the apparatus may be propelled, from opposite sides thereof.

2. A hand-operated flame apparatus comprising a pair of spaced fuel-tank-supporting members, side members connected to each end of each of said spaced fuel-tank-supporting members and extending downwardly to form an inverted generally U-shaped skeletal body adapted to pass over a crop row, said side members being adjustably connected to said spaced fuel-tank-supporting members to permit varying of the distance between said side members, supporting wheels carried by the lower portion of said side members, burner supporting members extending forwardly from said side members, and burners adjustably mounted on said burner supporting members and positionable to project flames inwardly and across a crop row, along which the apparatus may be propelled, from opposite sides thereof.

3. A hand-operated flame apparatus comprising a pair of spaced fuel-tank-supporting members, side members connected to each end of each of said spaced fuel-tank-supporting members and extending downwardly to form an inverted generally U-shaped skeletal body adapted to pass over a crop row, said side members being adjustably connected to said spaced fuel-tank-supporting members to permit varying of the distance between said side members, supporting wheels carried by the lower portion of said side members, burner supporting members extending forwardly from said side members, burners adjustably mounted on said burner supporting members and positionable to project flames inwardly and across a crop row, along which the apparatus may be propelled, from opposite sides thereof, said burner supporting members having portions adapted to rest on the ground to maintain the apparatus in upright position when not in use, and a handle extending rearwardly from said body at one side to permit propulsion by an operator traveling along one side of the crop row.

ATHERTON RICHARDS.

REFERENCES CITED

The following references are of record in the file of this patent:

UNITED STATES PATENTS

| Number | Name | Date |
|---|---|---|
| 637,382 | Giles | Nov. 21, 1899 |
| 843,741 | Fielder | Feb. 12, 1907 |
| 993,131 | Walton | May 23, 1911 |
| 1,180,434 | Robinson | Apr. 25, 1916 |
| 1,203,531 | Givens | Oct. 31, 1916 |
| 1,253,860 | Miller et al. | Jan. 15, 1918 |
| 1,335,928 | Alexander | Apr. 6, 1920 |
| 1,538,276 | Dressen | May 19, 1925 |
| 1,754,083 | Collins et al. | Apr. 8, 1930 |
| 2,043,761 | Marshall | June 9, 1936 |
| 2,048,813 | Porterfield | July 28, 1936 |
| 2,260,344 | Shaw | Oct. 28, 1941 |
| 2,327,204 | McLemore | Aug. 17, 1943 |
| 2,369,154 | McLemore | Feb. 13, 1945 |
| 2,391,027 | McLemore | Dec. 18, 1945 |
| 2,401,796 | Raitch | June 11, 1946 |

FOREIGN PATENTS

| Number | Country | Date |
|---|---|---|
| 161,919 | Great Britain | July 17, 1922 |
| 213,241 | Great Britain | Nov. 20, 1924 |
| 410,475 | Great Britain | May 15, 1934 |